US007275027B2

(12) United States Patent
Sproule et al.

(10) Patent No.: US 7,275,027 B2
(45) Date of Patent: Sep. 25, 2007

(54) FACILITATING COMMUNICATION WITH AUTOMOTIVE VEHICLE BUSES

(75) Inventors: William D. Sproule, Woodinville, WA (US); W. Michael Anderson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 773 days.

(21) Appl. No.: 10/379,358

(22) Filed: Mar. 4, 2003

(65) Prior Publication Data

US 2004/0176935 A1 Sep. 9, 2004

(51) Int. Cl.
G06F 9/45 (2006.01)
G06F 9/455 (2006.01)
G06F 7/00 (2006.01)

(52) U.S. Cl. .............................. 703/22; 703/23; 701/2; 701/36; 717/140; 717/177

(58) Field of Classification Search .................. 703/22, 703/23, 13; 701/1, 2, 36; 717/104, 140, 717/177; 709/203
See application file for complete search history.

(56) References Cited

U.S. PATENT DOCUMENTS

| | | | |
|---|---|---|---|
| 6,236,909 B1 * | 5/2001 | Colson et al. ................. | 701/1 |
| 6,449,541 B1 * | 9/2002 | Goldberg et al. ............ | 701/36 |
| 6,636,789 B2 * | 10/2003 | Bird et al. .................... | 701/29 |
| 7,020,701 B1 * | 3/2006 | Gelvin et al. ............... | 709/224 |
| 2003/0167454 A1 * | 9/2003 | Iordanov et al. ............ | 717/104 |
| 2004/0185777 A1 * | 9/2004 | Bryson ...................... | 455/41.1 |

OTHER PUBLICATIONS

L. Virginia Williams, "Industry Efforts to Standarize the Car Bus," Technology and Standards department, Consumer Electronics Association, 2002 IEEE, 2 pages.
M. Klausner et al., "Vehicle Data Management System with Remote Access to Electronic Control Unit Internal States," ADAS01: International Conference on Advanced Driver Assistance Systems, Sep. 17-18, 2001, pp. 68-72.
S.J. Ross, et al., "A composable Framework for Secure Multi-Modal Access to Internet Services from Post-PC Devices," Computer Science Department, University of California—Berkeley, 2000 IEEE, pp. 171-182.
Coco Ciocan, Communication & Control Electronics Limited, UK, The Automotive Audio/Video-Telematics Data Bus, Sep. 2000, pp. 179-182.

\* cited by examiner

Primary Examiner—Thai Phan
(74) Attorney, Agent, or Firm—Lee & Hayes, PLLC (57) ABSTRACT

Facilitating communication with automotive vehicle buses may be enabled using a vehicle gateway device (VGWD) and/or a vehicle gateway server (VGWS). In a described implementation, a VGWS may use a vehicle model database to translate requested vehicle data in a generic format from a generic data request into a vehicle-specific data format. VGWS may then send a vehicle-specific data request that has requested vehicle data in the vehicle-specific data format to a VGWD. The VGWD is able to acquire the desired vehicle data from a vehicle bus without translation using the vehicle-specific data format. The VGWD may forward the desired vehicle data in the vehicle-specific data format to the VGWS. The VGWS may then use the vehicle model database to translate the desired vehicle data in the vehicle-specific data format into desired vehicle data in a generic format. This desired generic vehicle data may be returned to a requesting entity.

48 Claims, 7 Drawing Sheets

FACILITATING COMMUNICATION WITH AUTOMOTIVE VEHICLE BUSES

TECHNICAL FIELD

This disclosure relates in general to facilitating communication with diverse automotive vehicle buses and in particular, by way of example but not limitation, to enabling adaptive automotive telematics using a vehicle gateway server having a vehicle model database that stores entries indicating available vehicle-specific data for different vehicles.

BACKGROUND

Computer processors have been used in vehicles for years for specific individual functions such as for controlling anti-lock braking and climate control systems. As processor use in vehicles has evolved, processors have been proliferating across many different vehicle features and systems, including fuel adjustment, drive-by-wire, and so forth. In fact, single processors are now used for multiple functions and are often coupled to automotive vehicle buses. Hence, each vehicle now typically has one or more buses across which vehicle data is propagated.

This vehicle data may include speed, fuel level, location, and other data that is directly related to driving and/or motoring. This vehicle data may also include climate control settings, musical selections, which owner or other family member is driving, seat adjustment positions and other data that is primarily related to entertainment and/or comfort. In addition to typical in-vehicle use, this vehicle data may also be used beneficially outside the vehicle. For example, vehicle speed can be considered to indicate whether information regarding upcoming available roadside services should be delivered to a driver half a mile in advance or two miles in advance.

A module interface may be designed and installed in the vehicle at the time of manufacturing that provides certain vehicle data from the one or more vehicle buses to external entities in prescribed forms and/or at pre-set times. Each of these module interfaces are only capable of providing vehicle data in the form, at the times, and to the extent that is pre-established by the manufacturer. This limits the availability of such vehicle data to entities that are external to the vehicle.

Furthermore, automotive manufacturers tend to design and install proprietary systems and individual components for each make and model. Consequently, any such module interface is specialized and therefore that much more inflexible. These two factors separately and jointly constrain the types of services and/or communications that may be effectuated with respect to the vehicle and to the occupants thereof because access to vehicle data is inherently limited.

Accordingly, there is a need for schemes and/or techniques for exposing multiple types of vehicle data from diverse automotive vehicle buses to external entities so that tailored services may be provided to vehicles and occupants thereof.

SUMMARY

Facilitating communication with automotive vehicle buses may be enabled using a vehicle gateway device (VGWD), a vehicle gateway server (VGWS), and/or a vehicle model database.

An exemplary described VGWD includes: at least one interface for communicating with one or more vehicle buses, the one or more vehicle buses capable of propagating vehicle data in accordance with a vehicle-specific format; wherein the VGWD is capable of receiving vehicle-specific data requests from a VGWS and sending vehicle-specific data responses to the VGWS, each vehicle-specific data request including vehicle data in the vehicle-specific format; and wherein the VGWD is adapted to detect vehicle data in the vehicle-specific format on the one or more vehicle buses via the at least one interface based on each vehicle-specific data request and is configured to formulate each vehicle-specific data response using the detected vehicle data in the vehicle-specific format.

An exemplary described method for a VGWS includes the actions of: receiving a generic data request from an entity; translating the generic data request to a vehicle-specific data request; sending the vehicle-specific data request to a vehicle; receiving a vehicle-specific data response from the vehicle; translating the vehicle-specific data response to a generic data response; and sending the generic data response to the entity.

An exemplary described database on one or more electronically-accessible media includes: multiple entries that are each directed to a specific vehicle type, each entry of the multiple entries including multiple fields, each field of the multiple fields establishing a correspondence between a piece of generic data and a vehicle-specific data format; wherein the vehicle-specific data format is associated with the specific vehicle type. The specific vehicle type may be, for example, one or more of a vehicle make, a vehicle model, a vehicle year, and a vehicle version.

Other method, system, apparatus, media, arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Figure 1:
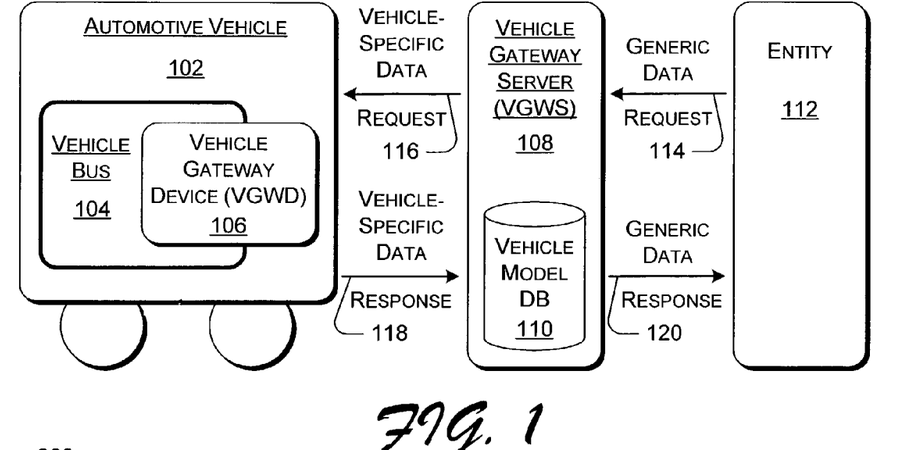
FIG. 1 illustrates a vehicle gateway server (VGWS) that facilitates communication with a vehicle bus via a vehicle gateway device (VGWD).

FIG. 1 illustrates a vehicle gateway server (VGWS) 108 that facilitates communication with a vehicle bus 104 via a vehicle gateway device (VGWD) 106. An automotive vehicle 102 includes vehicle bus 104 that is connected to VGWD 106. Automotive vehicle 102 may be any motorized vehicle including, for example, a passenger vehicle such as a car, sport utility vehicle (SUV), light truck, or small van;

a motorcycle; a common carrier vehicle such as a bus or large van; a transportation vehicle such as a semi tractor/trailer; and so forth.

Vehicle bus 104 may be comprised of one-or more buses that are used to propagate vehicle data around vehicle 102 for driving, security, entertainment, or other purposes. Vehicle bus 104 may operate in accordance with one or more standard bus protocols and/or in accordance with one or more proprietary protocols. The data that is present on vehicle bus 104 varies from vehicle 102 to vehicle 102, and the format in which such data exists may also vary based on the protocol(s) of vehicle bus 104 and/or the particularities of vehicle 102. VGWD 106 enables data from vehicle bus 104 to be provided to points external to vehicle 102 via a wired or wireless communications link.

VGWS 108 is capable of communicating with VGWD 106 via the wired or wireless communications link. VGWS 108 is also capable of understanding the specifics of data that is present on vehicle bus 104 using a vehicle model database (DB) 110. Vehicle model DB 110 enables translation from generic data to vehicle-specific data. For example, vehicle model DB 110 may organize different vehicle types by make, model, etc. with an association between each make and model and various data that is present on the vehicle buses 104 thereof. Furthermore, a correspondence is established in vehicle model DB 110 between generic data and vehicle-specific data by vehicle type. Consequently, using vehicle model DB 110, VGWS 108 can translate a request for generic data into a request for vehicle-specific data that is (or may be from time to time) present on vehicle bus 104.

Entity 112 is capable of providing such requests for generic data to VGWS 108 via one or more wired or wireless communication links. Entity 112 may be one or more entities such as a particular person and/or access device, a particular organization and/or service provider, and so forth. In operation, an entity 112 submits a generic data request 114 that includes desired generic data to VGWS 108. VGWS 108 uses vehicle model DB 110 to translate the generic data of generic data request 114 into vehicle-specific data as it exists on vehicle bus 104 of vehicle 102. VGWS 108 formulates a vehicle-specific data request 116 that includes the desired vehicle-specific data and sends it to VGWD 106 via one or more wired or wireless communications link.

VGWD 106 does not need to understand the contents of vehicle-specific data request 116 with respect to any real-world or generic equivalency of the desired data. In other words, VGWD 106 does not need to interpret the vehicle-specific data or perform any translation/conversion to (or from) generic data. If necessary to retrieve the desired vehicle data, VGWD 106 places all or a portion of the vehicle-specific data of vehicle-specific data request 116 onto vehicle bus 104. VGWD 106 also monitors vehicle bus 104 to detect the desired vehicle-specific data as requested by vehicle-specific data request 116.

Detection logic for VGWD 106 with respect to vehicle bus 104 may also be capable of performing more complex and/or state based logic. Examples include (i) notifying on first detection only, (ii) notifying on detecting X count, (iii) notifying on detecting Y condition only after condition Z, (iv) some combination thereof, and so forth. Such detection logic provides filtering to reduce the traffic over the one or more wired or wireless communications links between VGWD 106 and VGWS 108. Optional filtering capabilities are described further below with reference to FIG. 7. Once the desired vehicle-specific data is detected on vehicle bus 104 in accord with any stipulated filtering, VGWD 106 formulates a vehicle-specific data response 118 that includes the desired vehicle-specific data.

VGWD 106 sends vehicle-specific data response 118 to VGWS 108 via the one or more wired or wireless communications link therebetween. VGWS 108 uses vehicle model DB 110 to translate the desired vehicle-specific data from vehicle-specific data response 118 into the generic data as previously requested by entity 112 in generic data request 114. A generic data response 120 that includes the desired generic data is formulated by VGWS 108. VGWS 108 then provides generic data response 120 to entity 112 via the one or more wired or wireless communication links connecting the two. Entity 112 may then use the generic data from generic data response 120 as desired.

Figure 2:
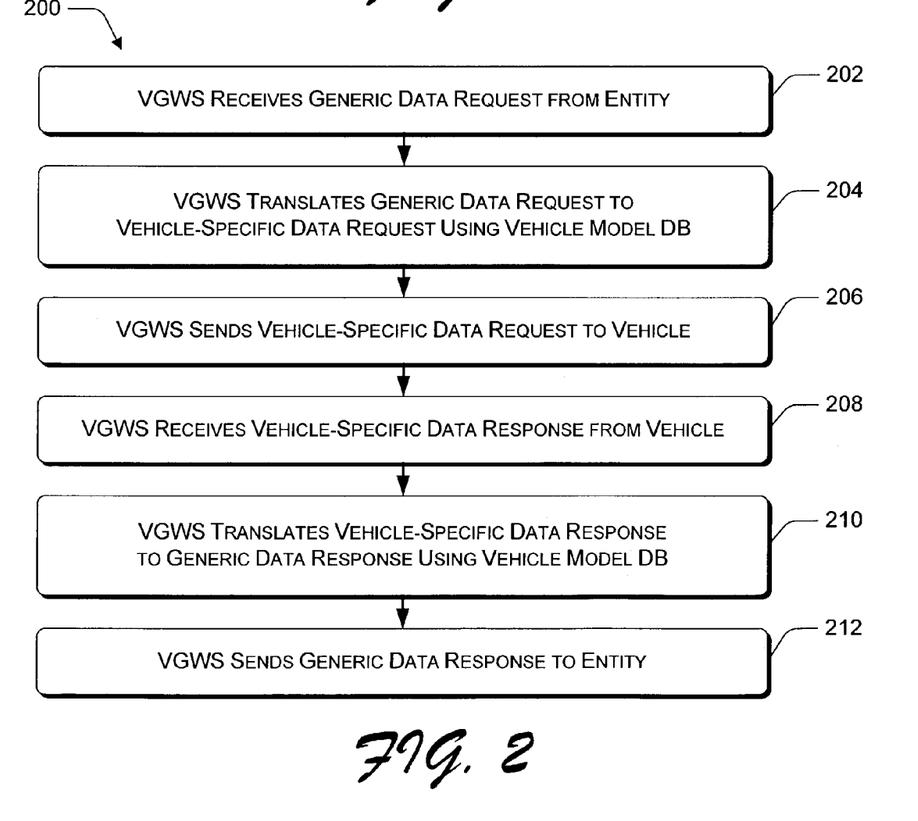
FIG. 2 is a flow diagram that illustrates an exemplary method for facilitating communication with a vehicle bus from the perspective of a VGWS.

FIG. 2 is a flow diagram 200 that illustrates an exemplary method for facilitating communication with a vehicle bus from the perspective of a VGWS 108. Flow diagram 200 includes six (6) blocks 202-212. Actions corresponding to blocks 202-212 may be performed, for example, by VGWS 108 (of FIG. 1). At block 202, a VGWS receives a generic data request from an entity. At block 204, the VGWS translates the generic data request to a vehicle-specific data request using a vehicle model DB. For example, generic data from the generic data request is translated into a format that comports with the protocol(s) of a vehicle bus of a targeted vehicle.

At block 206, the VGWS sends the vehicle-specific data request to a targeted vehicle. The VGWS receives a vehicle-specific data response from the targeted vehicle at block 208. At block 210, the VGWS translates the vehicle-specific data response to a generic data response using the vehicle model DB. For example, the desired data that is still formatted in accordance with the protocol(s) of the vehicle bus of the targeted vehicle is translated into a generic format. At block 212, the VGWS sends the generic data response to the requesting entity.

Figure 3:
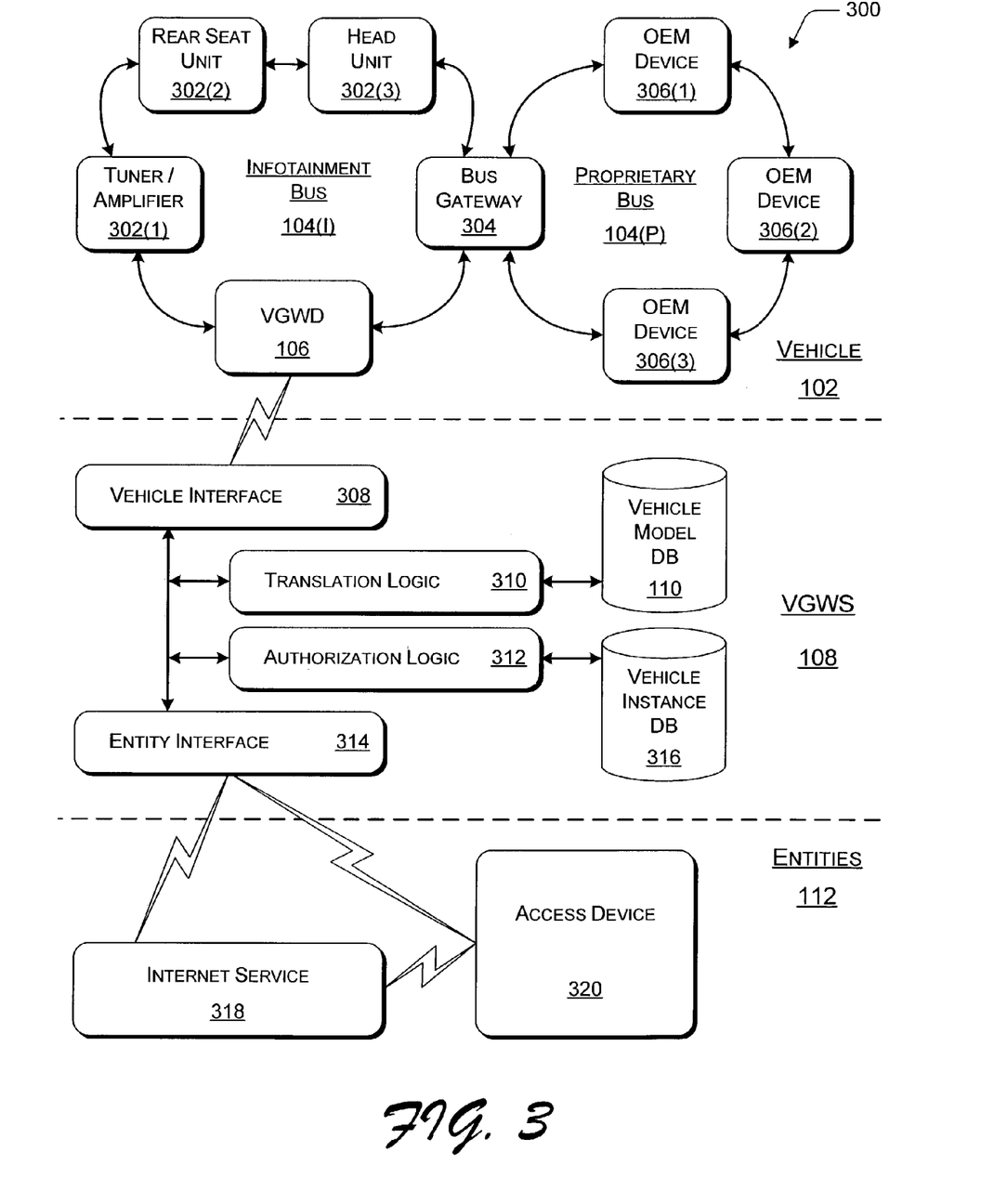
FIG. 3 illustrates an exemplary approach to facilitating communication with vehicle buses.

FIG. 3 illustrates an exemplary approach 300 to facilitating communication with vehicle buses 104. Exemplary approach 300 is divided into three parts that correspond to a vehicle 102, a VGWS 108, and entities 112. The various parts illustrated in FIG. 3 may communicate between and among each other using one or more wired or wireless communication links as indicated by the lightning-bolt-shaped communication symbols.

Illustrated entities 112 include an internet service 318 and an access device 320; however, entities 112 may include alternative types of entities. Internet service 318 may be an internet service provider, a provider of services through the internet, and so forth. For example, a provider of services through the internet may provide a location-sensitive, updated listing of upcoming available roadside services to a driver of vehicle 102, may keep track of the location and/or driving habits of a driver of vehicle 102 while providing real-time updates, and so forth. An internet service provider, on the other hand, provides access to the internet to subscribers using one or more access devices 320.

An access device 320 may be, for example, a mobile phone, a personal digital assistant (PDA), a laptop computer, a desktop computer, a pager, a tablet PC, a smart audio/visual appliance, and so forth. These access devices 320 may communicate data requests to VGWS 108 directly or via an internet service 318 such as an internet service provider.

In operation, internet service 318 and/or access device 320 sends a generic data request (not explicitly shown in FIG. 3) to VGWS 108. The generic data request includes a request for vehicle data of vehicle 102, but the vehicle data is requested in a generic format. For example, the requested vehicle data may be for the present speed of vehicle 102 and/or for the current seat settings of the driver of vehicle 102.

VGWS 108 receives the generic data request from entity 112 at entity interface 314. An exemplary implementation and environment for VGWS 108 and/or entities 112 is described below with particular reference to FIG. 8. The described exemplary implementation and environment includes processors, transmission and storage media, input/output (I/O)/communication interfaces, remote computing and connection technology, and so forth. Thus, as described further below, entity interface 314 may be a wired or wireless modem, a network interface card, and so forth.

Authorization logic 312 receives the generic data request from entity interface 314. Authorization logic 312 is capable of reviewing the generic data request to determine whether the generic data request is authorized using vehicle instance DB 316. Authorization logic 312 looks up an entry in vehicle instance DB 316 for the vehicle/owner that is targeted by the generic data request from entity 112. By consulting the entry in vehicle instance DB 316 for the targeted vehicle and/or vehicle owner, authorization logic 312 may determine whether the requesting entity 112 is an accepted entity and whether the requested vehicle data is approved vehicle data for this targeted vehicle/owner. An exemplary vehicle instance DB 316 is described further below with particular reference to FIG. 5.

If the requesting entity 112 and the requested data are authorized, authorization logic 312 forwards the generic data request to translation logic 310. Translation logic 310 is capable of translating the generic data request into a vehicle-specific data request using vehicle model DB 110. An exemplary vehicle model DB 110 is described further below with particular reference to FIG. 4. Translation logic 310 accesses vehicle model DB 110 to find an entry with the same make/model/etc. as that of the targeted vehicle 102. If the generic data request does not include the vehicle type of the targeted vehicle, authorization logic 312 may extract it from vehicle instance DB 316 at the appropriate owner/vehicle entry.

Translation logic 310 locates the appropriate entry having the same make/model/etc. as the target vehicle 102 and determines whether vehicles of that type place the requested data on their vehicle buses 104. For example, many modern vehicles include current speed on their electronic vehicle buses 104. However, only more luxurious models tend to record in memory preferred driver seating positions. If the targeted vehicle 102 does include the requested data on its vehicle bus 104, then translation logic 310 extracts the corresponding vehicle-specific data format.

A vehicle-specific data format as extracted from vehicle model DB 110 includes the requested generic data in a format that comports with one or more protocols under which the vehicle buses 104 of the targeted vehicle 102 operate. This vehicle-specific data format is also already configured into whatever codes, terms, context, etc. are used on the targeted vehicle bus(es) 104, as applicable. The vehicle-specific data format is then used to formulate a vehicle-specific data request (not explicitly shown in FIG. 3). The vehicle-specific data request is forwarded to vehicle interface 308 from which it is transmitted wirelessly or by wire to vehicle 102. At vehicle 102, VGWD 106 receives the vehicle-specific data request.

In exemplary approach 300, vehicle bus 104 comprises two buses: an infotainment bus 104(I) and a proprietary bus 104(P). As illustrated, infotainment items 302 on infotainment bus 104(I) include a tuner/amplifier 302(1), a rear seat unit 302(2), and a head unit 302(3). Infotainment items 302 generally include those items of vehicle 102 that are directed to entertainment, general information, computing, off-vehicle communication, comfort, and so forth.

Proprietary bus 104(P) includes one or more original equipment manufacturer (OEM) devices such as the three OEM devices 306(1,2,3) that are illustrated. Such OEM devices may include those directed to the braking system, drive-by-wire, tire pressure sensing, traction control, engine management, safety and security, and so forth. In other words, OEM devices 306 generally include those items of vehicle 102 that are directed to driving control, motoring, security and safety issues, accident avoidance, and so forth.

A bus gateway 304 connects infotainment bus 104(I) to proprietary bus 104(P). Typically, proprietary bus 104(P) is kept somewhat isolated because of the readily-apparent accident-related risks that would arise if it were easy to control OEM devices 306 from an off-vehicle location. Consequently, bus gateway 304 has few, if any, opportunities or abilities to write data to proprietary bus 104(P). However, bus gateway 304 is usually enabled to read most, if not all, of the vehicle data that is propagating over proprietary bus 104(P). In fact, VGWD 106 can ask bus gateway 304 to monitor proprietary bus 104(P) for certain vehicle data and can receive the results.

As described above, VGWD 106 receives the vehicle-specific data request. This vehicle-specific data request includes the requested data in the vehicle-specific data format. VGWD 106 need perform no translation or conversion of the vehicle-specific data format. VGWD 106 does know how to interact with one or more vehicle buses such as infotainment bus 104(I). In other words, VGWD 106 is able to create packets for and retrieve packets from infotainment bus 104(I).

Depending on the requested vehicle data, VGWD 106 may be able to simply monitor infotainment bus 104(I) for packets that include the requested vehicle-specific data as specified by the vehicle-specific data format in the vehicle-specific data request from VGWS 108. For example, VGWD 106 may be instructed by VGWS 108 to listen for a certain header content or other code in a packet that indicates that the content of the packet is the requested vehicle data. Alternatively, VGWD 106 may first need to place packet(s) on infotainment bus 104(I) in order to elicit the requested vehicle data. VGWS 108 also provides the contents for any such packets in the vehicle-specific data format. These packets for eliciting vehicle data may be directed to, for example, bus gateway 304, an infotainment item 302, and so forth.

After VGWD 106 detects the requested vehicle data in the vehicle-specific data format, VGWD 106 formulates a vehicle-specific data response that includes the requested vehicle data in the vehicle-specific data format. This vehicle-specific data response is sent to vehicle interface 308, which forwards it to translation logic 310. Translation logic 310 uses vehicle model DB 110 to translate the requested vehicle data in the vehicle-specific data format to a generic format. For example, a speed-indicating code may be translated into miles per hour. This vehicle data in the generic format is then sent to the requesting entity 112 in a generic data response.

Figure 4:
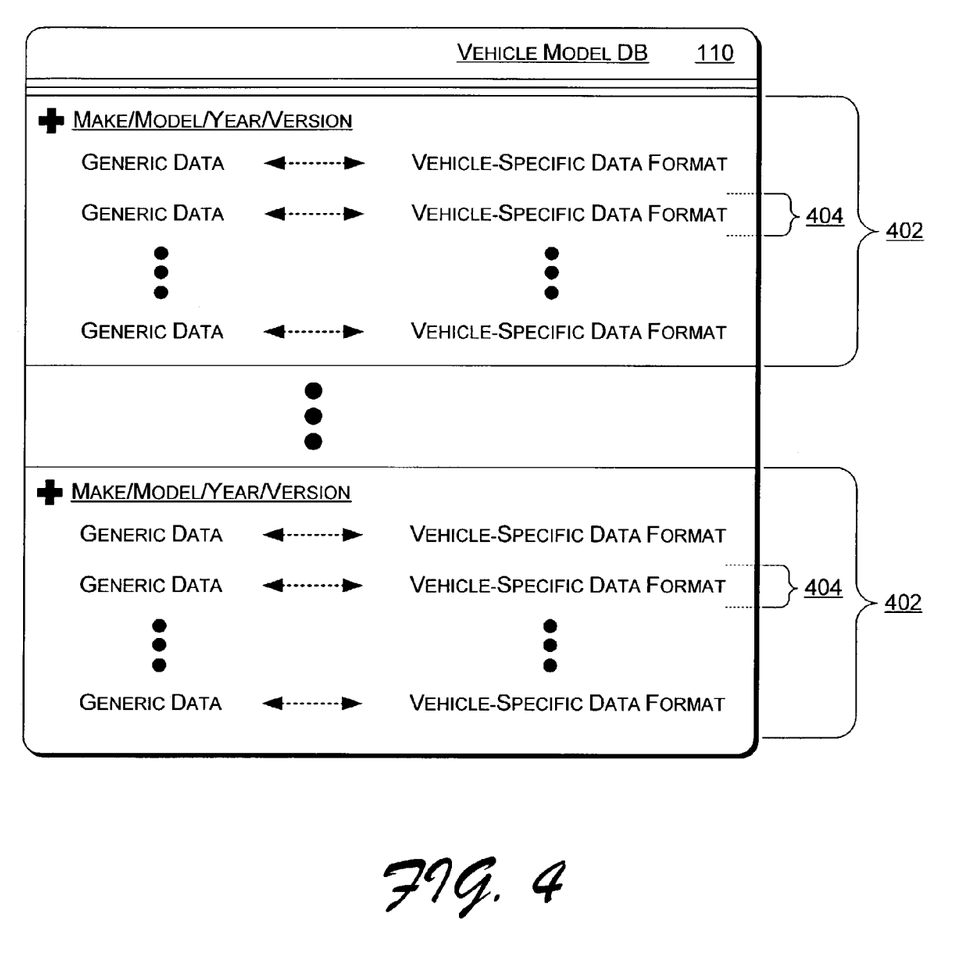
FIG. 4 is an exemplary vehicle model database.

FIG. 4 is an exemplary vehicle model database 110. Vehicle model DB 110 includes multiple vehicle entries 402. Each vehicle entry 402 associates a specific vehicle type with one or more generic data options for vehicle data. Such vehicle data are present, at least occasionally, on a vehicle bus 104 of a vehicle 102 that is of the specific vehicle type.

Vehicle entries 402 of vehicle model DB 110 may be searched by make, model, year, and/or version for the targeted vehicle 102.

Thus, each vehicle entry 402 represents a specific make, model, year, and/or version of a vehicle. For example, if the same make and model have differing vehicle data from one year to the next, then two separate vehicle entries 402 may be added to vehicle model DB 110. Also, if the same make and model within a single year have differing vehicle data for a standard version as compared to a deluxe version, then two separate vehicle entries 402 may be added to vehicle model DB 110. Alternatively, a given make and model with different model years and/or upgrade versions with identical vehicle data options may have only a single vehicle entry 402.

Each vehicle entry 402 includes one or more fields 404 that establish a correspondence between generic data and a vehicle-specific data format. Each field 404 may thus be used to translate generic data to a vehicle-specific data format that comports with a protocol of one or more vehicle buses 104 without needing further translation or conversion (e.g., by a VGWD 106). Each field 404 may also be used for performing translations in the reverse direction from a vehicle-specific data format to a generic data format. Because vehicle model DB 110 is software based, new fields 404 for newly-desired generic data may be added as time passes as long as such vehicle data is present on a vehicle bus 104.

Figure 5:
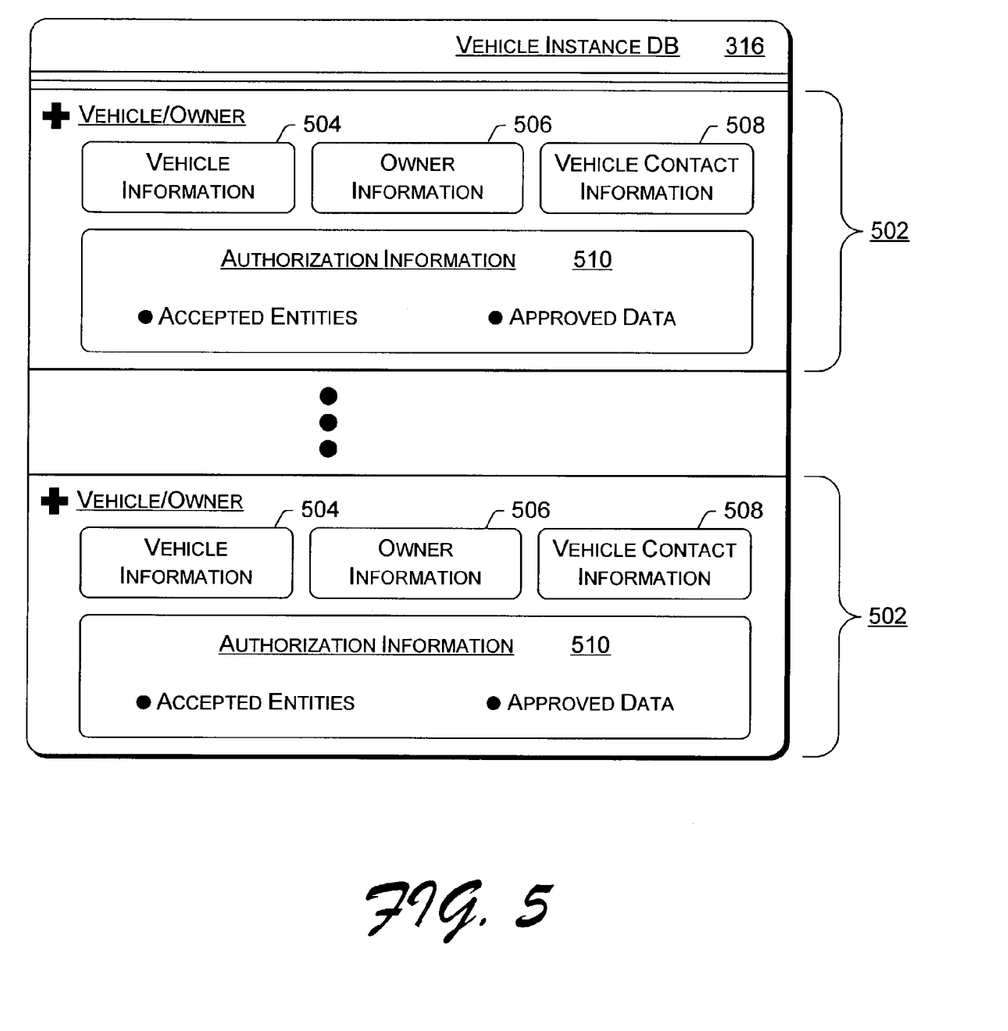
FIG. 5 is an exemplary vehicle instance database.

FIG. 5 is an exemplary vehicle instance database 316. Vehicle instance DB 316 includes multiple vehicle/owner entries 502. Each vehicle/owner entry 502 associates a specific vehicle and/or owner with one or more different types of information 504, 506, 508, and 510. Vehicle instance DB 316 may be searched at least by vehicle information 504 and/or owner information 506, depending on the knowledge of the requesting entity 112 and/or the content of a generic data request.

Vehicle information 504 may include a vehicle identification number (VIN), vehicle make/model/year/version/etc., and so forth. Owner information 506 may include owner name(s), contact information, billing information, one or more preferences or sets thereof, and so forth. Each entry 502 may also include vehicle contact information 508 in case a vehicle data request does not include such information. Vehicle contact information 508 includes that information that is necessary and/or desirable for contacting a vehicle 102, such as an appropriate wireless plan or standard for communications, a routing identifier or phone number, and so forth. More generally, vehicle contact information 508 may include a communication mode and/or an interface identifier.

Each entry 502 also includes authorization information 510. Authorization information 510 includes accepted entities and approved data. Accepted entities are those entities 112 that are authorized to communicate with the VGWD 106 of the associated vehicle 102. Approved data is that vehicle data that is authorized to be read from vehicle buses 104 by the VGWD 106 of the associated vehicle 102. This information of authorization information 510 may be organized in any of many possible manners. For example, accepted entities and approved data may merely be listed separately. Alternatively, each particular accepted entity may have a corresponding list of approved data, or vice versa. Thus, one entity 112 may be authorized to attain current speed and current seating position from a vehicle bus 104 while another entity 112 may only be authorized to attain current speed.

Figure 6:
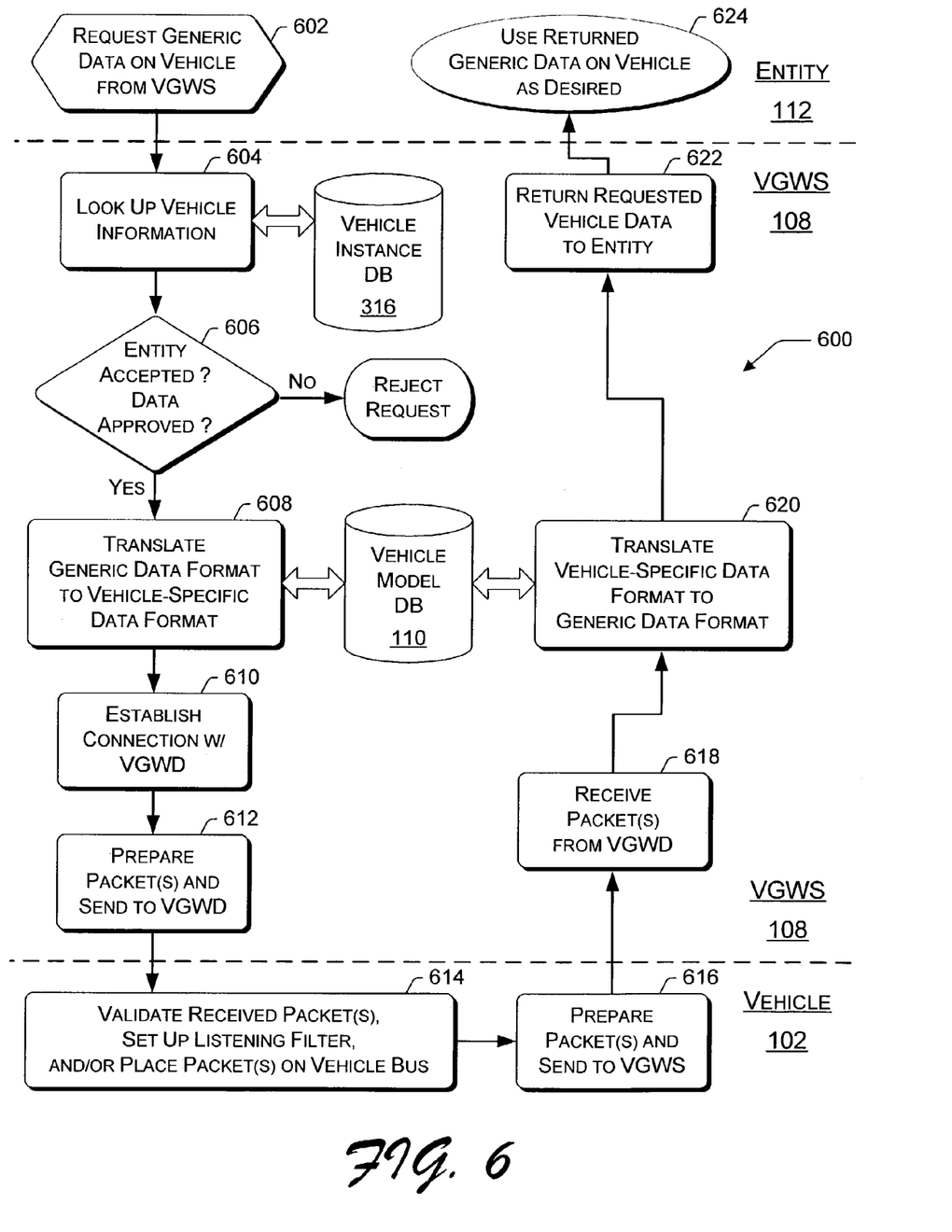
FIG. 6 is a flow diagram that illustrates an exemplary process for facilitating communication with vehicle buses.

FIG. 6 is a flow diagram that illustrates an exemplary process 600 for facilitating communication with vehicle buses 104. Exemplary process 600 includes twelve (12) blocks 602-624 and is divided into three parts that correspond to a vehicle 102, a VGWS 108, and an entity 112. Entity 112 may perform the actions of blocks 602 and 624; VGWS 108 may perform the actions of blocks 604-612 and 618-622; and vehicle 102 may perform the actions of blocks 614 and 616.

At block 602, entity 112 requests generic data on vehicle 102 from VGWS 108. For example, entity 112 may ask VGWS 108 for the current speed and/or the current seat settings for vehicle 102. The generic data request includes an identification of the vehicle and/or the owner(s). At block 604, VGWS 108 looks up the vehicle information for vehicle 102 in vehicle instance DB 316. For example, VGWS 108 locates the appropriate entry 502 (of FIG. 5) for the requested vehicle/owner in vehicle instance DB 316. Vehicle information 504 is consulted if the generic data request does not specify the vehicle make, model, year, and/or version. Authorization information 510 is also extracted from vehicle instance DB 316.

At block 606, from authorization information 510, VGWS determines whether entity 112 is an accepted entity and whether the requested generic data is approved data. If either determination is negative, then the generic data request is rejected. Otherwise, at block 608, VGWS 108 accesses vehicle model DB 110 and translates the generic data request into a vehicle-specific data request. For example, using the vehicle make, model, year, and/or version as extracted from the appropriate vehicle/owner entry 502 of vehicle instance DB 316, VGWS 108 locates the appropriate specific vehicle entry 402 (of FIG. 4) in vehicle model DB 110.

If the requested generic data is associated with the appropriate specific vehicle entry 402 (i.e., the desired vehicle data is present on the vehicle bus 104 of vehicle 102), then a field 404 with the requested generic data is located in the specific vehicle entry 402. This field 404 is inspected so as to determine a corresponding vehicle-specific data format. This vehicle-specific data format is then extracted from vehicle model DB 110. The vehicle-specific data format is a format that comports with a protocol under which the vehicle bus 104 of vehicle 102 operates. If a special code, a header indicator, etc. is relevant for the desired vehicle data, then the special code, the header indicator, etc. is part of the vehicle-specific data format.

At block 610, a connection (e.g., a wireless communication link) is established with a VGWD 106 (of FIGS. 1, 3, and 7) of vehicle 102. At block 612, packet(s) for the vehicle-specific data request are prepared and sent to the VGWD 106. These packets are received at vehicle 102 by the VGWD 106.

At block 614, the received packets are validated, a listening filter is set up, and/or packet(s) are placed on the vehicle bus 104 of vehicle 102. For example, the packets received from VGWS 108 may be authenticated as coming from a trusted source (e.g., a legitimate VGWS 108). A programmable packet filter may be set up to monitor the vehicle bus 104 for only certain particular packets as specified in the vehicle-specific data request. Also, if required or desirable to detect/precipitate the requested vehicle-specific data, packets are placed on the vehicle bus 104 by the VGWD 106. For instance, such packets may interrogate one or more infotainment items 302 (of FIG. 3) to prompt them to return data, may instruct bus gateway 304 to monitor proprietary bus 104(P) for certain data, and so forth. Additional functions and features of a VGWD 106 are described below with particular reference to FIG. 7.

After the VGWD 106 detects the desired vehicle-specific data, packet(s) including the desired vehicle-specific data are prepared and sent from vehicle 102 to VGWS 108 at block 616. At block 618, the packet(s) that include the desired vehicle-specific data are received from VGWD 106 at VGWS 108. At block 620, VGWS 108 translates the vehicle-specific data of the vehicle-specific data response into generic data for a generic data response using vehicle model DB 110.

For example, VGWS 108 returns to the appropriate specific vehicle entry 402 in vehicle model DB 110 and locates a field 404 with the desired vehicle-specific data in order to translate it into the corresponding generic data. However, it is possible that this translation is not necessary if the requested data is implicitly presented in the packet(s) received from vehicle 102. In this case, VGWS 108 may simply strip out the requested data and prepare a generic data response therefrom.

At block 622, the requested vehicle data in generic form is returned by VGWS 108 to entity 112 in the generic data response. At block 624, the returned generic data on vehicle 102 may be used by entity 112 as desired. For example, entity 112 may determine whether a husband or wife is driving based on current seat settings. Consequently, selection options for proximate roadside services may be tailored to the preferences of the appropriate spouse.

Figure 7:
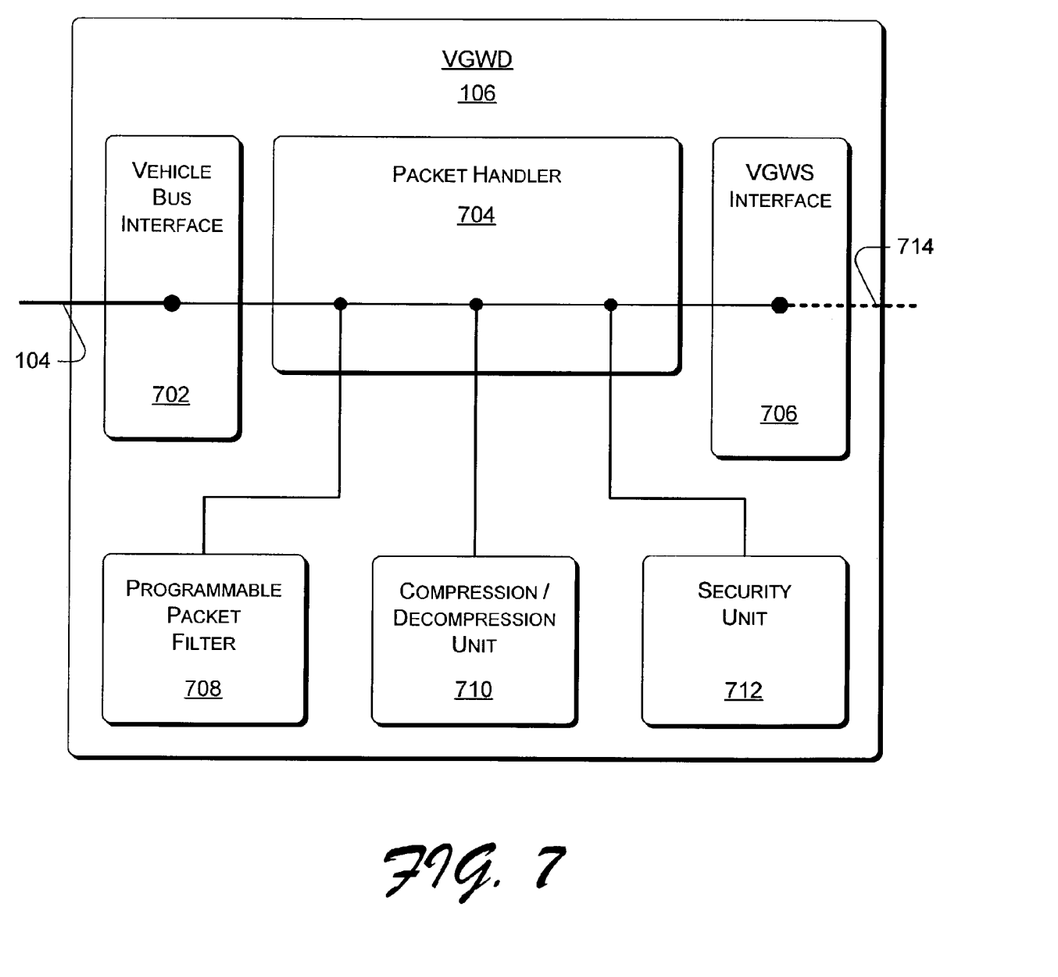
FIG. 7 is an exemplary vehicle gateway device (VGWD).

FIG. 7 is an exemplary vehicle gateway device (VGWD) 106. VGWD 106 illustrates multiple exemplary components 702-712. These components may be implemented as hardware, firmware, software, some combination thereof, and so forth. Exemplary hardware, firmware, software, etc. are described below in a general context with particular reference to FIG. 8. The exemplary hardware, firmware, software, etc. that are described below include media, processors, interfaces, electronically-executable instructions, and so forth.

A VGWS 108 (of FIGS. 1, 3, and 6) uses VGWD 106 to acquire vehicle data that is placed on or otherwise present on a vehicle bus 104 (of FIGS. 1, 3, and 7). In this sense, VGWD 106 functions as a vehicle proxy device. Communication between VGWS 108 and VGWD 106 may be effectuated over a wireless communication link 714 via VGWS interface 706 and vehicle interface 308 (of FIG. 3). Alternatively, the communication link may be wired, especially for diagnostic or testing purposes.

VGWS interface 706 is capable of both receiving and sending packets. VGWS interface 706 may be integral with VGWD 106 or separate therefrom. Also, VGWS interface 706 and/or VGWD 106 may be installed during manufacturing of a vehicle 102 or thereafter as an after-market product/service using a dedicated VGWS interface 706, a general mobile-telephone-type VGWS interface 706, and so forth. VGWD 106 also includes a vehicle bus interface 702 that is capable of interfacing with one or more vehicle buses 104. Vehicle bus interface 702 is therefore capable of putting packets onto and taking packets off of vehicle bus 104.

A packet handler 704 is capable of providing packets to and/or accepting packets from VGWS interface 706 and vehicle bus interface 702. Although illustrated as a single packet handler 704, packet handler 704 may alternatively be implemented as two or more packet handlers 704. Moreover, packet handler 704 capable of manipulating packets from both the communication link 714 that connects VGWD 106 and VGWS 108 as well as packets that are propagating on vehicle bus 104. For example, packet handler 704 is capable of extracting requested data (in a vehicle-specific data format) from packet(s) that are taken off of vehicle bus 104 and encapsulating the requested data (still in the vehicle-specific data format) into packet(s) that are transmitted across the wireless communication link 714 that is between VGWD 106 and VGWS 108. Packet handler 704 is further capable of effectuating such packet manipulation in the opposite direction.

Packet handler 704 is also adapted to utilize the functions of components 708, 710, and 712. Security unit 712 is used to authenticate arriving packets to validate that they originate from a trusted source such as a VGWS 108 to which the vehicle/owner subscribes or otherwise permits access. Encryption and decryption of outbound and inbound packets, respectively, may be effectuated using security unit 712. The ciphering algorithm(s) employed may be selected at the time of manufacture or subsequently loaded into VGWD 106.

Similarly, compression and decompression of outbound and inbound packets, respectively, may be effectuated using compression/decompression unit 710. Any suitable and mutually understood compression/decompression algorithm may be employed to manage the data density of the communications. Such an algorithm may originally be part of VGWD 106 at the time of manufacture or may be provided to VGWD 106 thereafter, e.g. by VGWS 108 or another source.

Programmable packet filter 708 is capable of filtering the packets, and the contents thereof, that are present on vehicle bus 104 in order to select which of those packets are to be forwarded to VGWS 108. Specifically, programmable packet filter 708 may be used to filter packets that are being monitored and/or detected on vehicle bus 104 via vehicle bus interface 702. Such filtering may be desirable, for example, because reviewing every appearance of a requested piece of vehicle data is unnecessary, because the bandwidth of the communication link 714 between VGWD 106 and VGWS 108 as compared to the bandwidth of vehicle bus 104 necessitates filtering, and so forth.

The filtering of programmable packet filter 708 may take any of many forms. For example, programmable packet filter 708 may be instructed (e.g., by VGWS 108) to select packets every time the vehicle alarm is set off, to select packets at the first five occurrences of an event at the start of every hour, to select every tenth occurrence of an event, to select every packet for a given event that registers a value above a certain (provided) threshold, and so forth. For instance, if a packet has a code indicating that the vehicle alarm has gone off, the relevant contents of that packet are sent to VGWS 108 via wireless communication link 714 by way of VGWS interface 706. However, VGWD 106 need not translate or convert the code because VGWS 108 is so capable using vehicle model DB 110. Packet handler 704 merely performs a packet manipulation in order to transform or repackage a packet that is appropriate for vehicle bus 104 into one that is appropriate for the wireless communication link 714 between VGWD 106 and VGWS 108.

Figure 8:
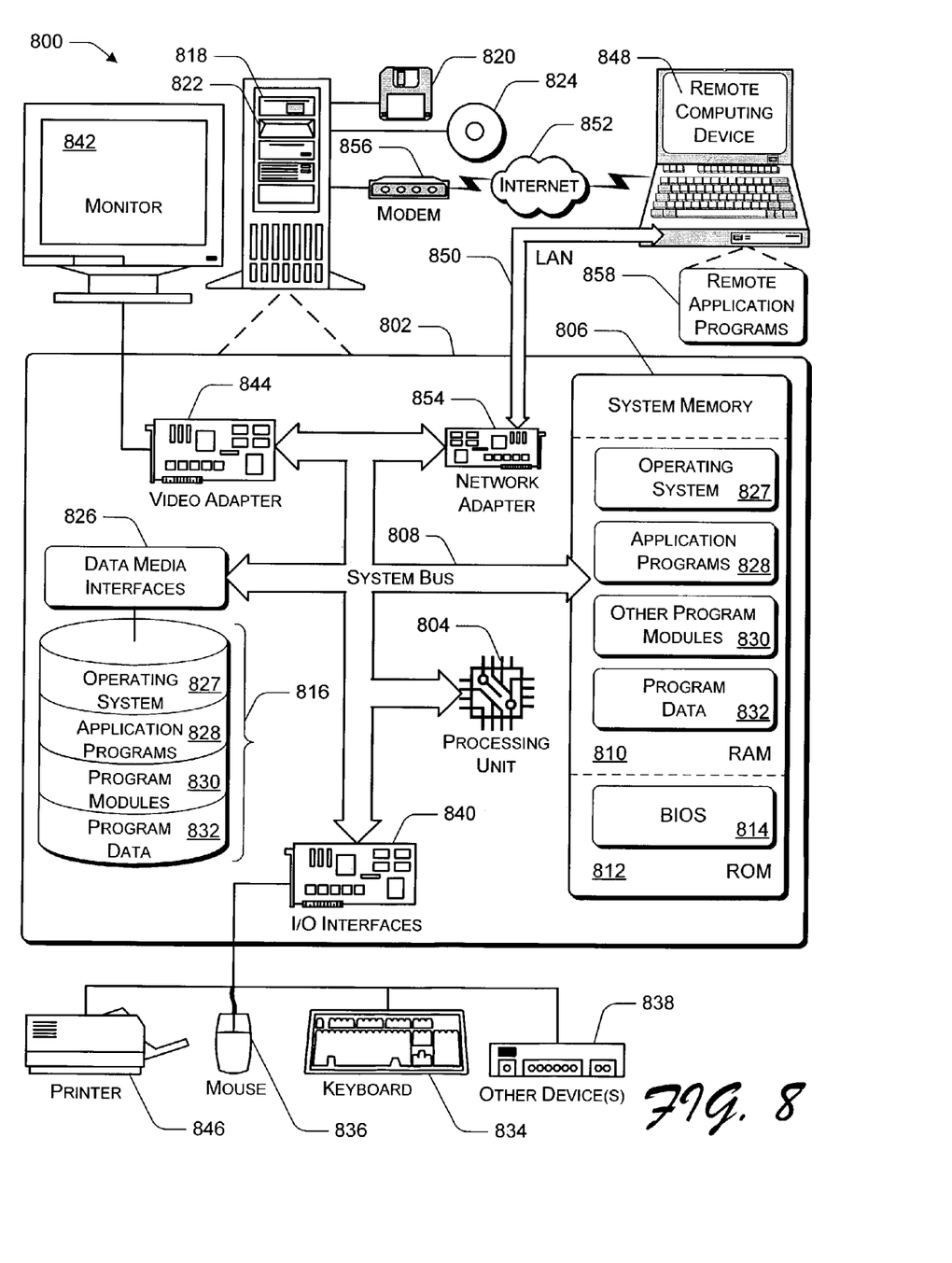
FIG. 8 illustrates an exemplary computing operating environment that is capable of (wholly or partially) implementing at least one approach, method, and/or process as described herein.

FIG. 8 illustrates an exemplary computing operating environment 800 that is capable of (fully or partially) implementing at least one system, device, component, approach, method, and/or process for facilitating communication with automotive vehicle buses as described herein. Computing environment 800 may be utilized in the computer and network architectures described below.

Exemplary computing operating environment 800 is only one example of a computing environment and is not intended to suggest any limitation as to the scope of use or functionality of the applicable computer (including general electronic device or module) architectures and distributed network architectures. Neither should computing environment 800 be interpreted as having any dependency or requirement relating to any one or any combination of components as illustrated in FIG. 8.

Additionally, facilitating communication with automotive vehicle buses may be implemented with numerous other general purpose or special purpose computing system environments or configurations. Examples of well known computing systems, environments, and/or configurations that may be suitable for use include, but are not limited to, dedicated or customizable computing modules, personal computers, server computers, thin clients, thick clients, personal digital assistants (PDAs) or mobile telephones, hand-held or laptop devices, multiprocessor systems, microprocessor-based systems, set top boxes, programmable consumer electronics, video game machines, network PCs, minicomputers, mainframe computers, distributed computing environments that include any of the above systems or devices, and so forth.

Implementations that facilitate communication with automotive vehicle buses may be described in the general context of electronically-executable instructions. Generally, electronically-executable instructions include routines, programs, objects, components, data structures, etc. that perform particular tasks or implement particular abstract data types. Facilitating communication with automotive vehicle buses, as described in certain implementations herein, may also be practiced in distributed computing environments where tasks are performed by remotely-linked processing devices that are connected through a communications link and/or network. Especially in a distributed computing environment, electronically-executable instructions may be located in separate storage media, executed by different processors, and/or propagated over transmission media.

Computing environment 800 includes a general-purpose computing device in the form of a computer 802, which may comprise any electronic device with computing and/or processing capabilities. The components of computer 802 may include, but are not limited to, one or more processors or processing units 804, a system memory 806, and a system bus 808 that couples various system components including processor 804 to system memory 806.

System bus 808 represents one or more of any of several types of bus structures, including a memory bus or memory controller, a peripheral bus, an accelerated graphics port, and a processor or local bus using any of a variety of bus architectures. By way of example, such architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a Controller Area Network (CAN) bus (e.g., SAE's IDB-C and Bosch's MCnet), a J1850 bus (which is an automotive network used predominantly by American automobile manufacturers), a Media Oriented Systems Transport (MOST) bus, and so forth.

Computer 802 typically includes a variety of electronically-accessible media. Such media may be any available media that is accessible by computer 802 or another electronic device, and it includes both volatile and non-volatile media, removable and non-removable media, and storage and transmission media.

System memory 806 includes electronically-accessible storage media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules/instructions that are immediately accessible to and/or being presently operated on by processing unit 804.

Computer 802 may also include other removable/non-removable and/or volatile/non-volatile electronic storage media. By way of example, FIG. 8 illustrates a hard disk drive or disk drive array 816 for reading from and writing to a (typically) non-removable, non-volatile magnetic media (not separately shown); a magnetic disk drive 818 for reading from and writing to a (typically) removable, non-volatile magnetic disk 820 (e.g., a "floppy disk"); and an optical disk drive 822 for reading from and/or writing to a (typically) removable, non-volatile optical disk 824 such as a CD-ROM, DVD-ROM, or other optical media. Hard disk drive 816, magnetic disk drive 818, and optical disk drive 822 are each connected to system bus 808 by one or more data media interfaces 826. Alternatively, hard disk drive 816, magnetic disk drive 818, and optical disk drive 822 may be connected to system bus 808 by one or more other separate or combined interfaces (not shown).

The disk drives and their associated electronically-accessible media provide non-volatile storage of electronically-executable instructions, such as data structures, program modules, and other data for computer 802. Although exemplary computer 802 illustrates a hard disk 816, a removable magnetic disk 820, and a removable optical disk 824, it is to be appreciated that other types of electronically-accessible media may store instructions that are accessible by an electronic device, such as magnetic cassettes or other magnetic storage devices, flash memory, CD-ROM, digital versatile disks (DVD) or other optical storage, random access memories (RAM), read only memories (ROM), electrically erasable programmable read-only memories (EEPROM), and so forth. In other words, any electronically-accessible media may be utilized to realize the storage media of the exemplary computing system and environment 800.

Any number of program modules (or other units or sets of instructions) may be stored on hard disk 816, magnetic disk 820, optical disk 824, ROM 812, and/or RAM 810, including by way of general example, an operating system 827, one or more application programs 828, other program modules 830, and program data 832. By way of specific example for VGWS 108, application programs 828 and/or other program modules 830 may include electronically-executable instructions to implement the tasks and actions described herein for VGWS 108, such as those described with particular reference to FIGS. 1, 3, and 6. Program data 832 may include vehicle model DB 110 and/or vehicle instance DB 316 as stored in the same or separate disk drive(s) or disk drive arrays 816. Such program data 832 may be brought, as necessary or desirable, into RAM 810 for searching or other access purposes. And by way of specific example for VGWD 102, electronically-executable instructions thereof may be stored in a relatively small disk drive 816 and/or a firmware-type system memory 806.

A user may enter commands and information into computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to processing unit 804 via input/output interfaces 840 that are coupled to system bus 808. However, they may instead be connected by other interface and bus structures, such as a parallel port, a game port, a universal serial bus (USB) port, an IEEE 1394 interface, an IEEE 802.11 interface, a Bluetooth® wireless interface, and so forth.

A monitor 842 or other type of display device may also be connected to system bus 808 via an interface, such as a video adapter 844. In addition to monitor 842, other output peripheral devices may include components such as speakers (not shown) and a printer 846, which may be connected to computer 802 via input/output interfaces 840.

Computer 802 may operate in a networked environment using logical connections to one or more remote computers, such as a remote computing device 848. By way of example, remote computing device 848 may be a personal computer, a portable computer (e.g., laptop computer, tablet computer, PDA, mobile station, etc.), an electronic processing module, a server, a router, a network computer, a peer device, other common network node, or another computer type as listed above, and so forth. However, remote computing device 848 is illustrated as a portable computer that may include many or all of the elements and features described herein relative to computer 802.

Logical connections between computer 802 and remote computer 848 are depicted as a local area network (LAN) 850 and a general wide area network (WAN) 852. Such networking environments are commonplace in offices, enterprise-wide computer networks, intranets, the Internet, fixed and mobile telephone networks, other wireless networks, and so forth.

When implemented in a LAN networking environment, computer 802 is connected to a local area network 850 via a network interface or adapter 854. When implemented in a WAN networking environment, computer 802 typically includes a modem 856 or other means for establishing communications over wide area network 852. Modem 856, which may be internal or external to computer 802, may be connected to system bus 808 via input/output interfaces 840 or any other appropriate mechanism(s). It is to be appreciated that the illustrated network connections are exemplary and that other means of establishing communication link(s) between computers 802 and 848 may be employed.

In a networked environment, such as that illustrated with computing environment 800, program modules or other instructions that are depicted relative to computer 802, or portions thereof, may be fully or partially stored in a remote memory storage device. By way of example, remote application programs 858 reside on a memory device of remote computer 848. Also, for purposes of illustration, application programs 828 and other executable instructions such as operating system 827 are illustrated herein as discrete blocks, but it is recognized that such programs, components, and other instructions reside at various times in different storage components of computing device 802 (and/or remote computing device 848) and are executed by data processor(s) 804 of computer 802 (and/or those of remote computing device 848).

The methods and processes of FIGS. 2 and 6 are illustrated in flow diagrams that are divided into multiple blocks. However, the order in which the methods and processes are described is not intended to be construed as a limitation, and any number of the described blocks can be combined in any order to implement one or more methods or processes for facilitating communication with automotive vehicle buses. Furthermore, although the methods and processes are described herein with reference to the various implementations or approaches of FIGS. 1, 3-5, and 7 (as well as the exemplary system environment of FIG. 8) where applicable, the methods and processes can be implemented in any suitable hardware, software, firmware, or combination thereof and using any suitable server and device architectures, database configurations, communication technologies, and so forth.

Although systems, media, methods, approaches, processes, and other implementations have been described in language specific to structural and functional features and/or flow diagrams, it is to be understood that the invention defined in the appended claims is not necessarily limited to the specific features or flow diagrams described. Rather, the specific features and flow diagrams are disclosed as exemplary forms of implementing the claimed invention.

The invention claimed is:

1. A system for facilitating communication with one or more vehicle buses, the system comprising:
   one or more processors; and
   one or more media in operative communication with the one or more processors, the one or more media including:
   a vehicle model database that associates multiple specific vehicle types with available vehicle data; and
   electronically-executable instructions that, when executed, cause the one or more processors to perform actions comprising:
   translating requested vehicle data in a generic format into requested vehicle data in a vehicle-specific format using the vehicle model database; and
   translating desired vehicle data in the vehicle-specific format into desired vehicle data in the generic format using the vehicle model database.

2. The system as recited in claim 1, wherein the vehicle model database includes a plurality of entries, each entry of the plurality of entries associating a specific vehicle type with a plurality of available vehicle data.

3. The system as recited in claim 2, wherein each entry of the plurality of entries includes a plurality of fields, each field of the plurality of fields drawing a correspondence between a piece of available vehicle data in the generic format and in the vehicle-specific format.

4. The system as recited in claim 1, wherein the electronically-executable instructions, when executed, cause the one or more processors to perform further actions comprising:
   receiving from an entity a generic data request that includes the requested vehicle data in the generic format; and
   transmitting to the entity a generic data response that includes the desired vehicle data in the generic format.

5. The system as recited in claim 1, wherein the electronically-executable instructions, when executed, cause the one or more processors to perform further actions comprising:
   transmitting to a vehicle a vehicle-specific data request that includes the requested vehicle data in the vehicle-specific format; and
   receiving from the vehicle a vehicle-specific data response that includes the desired vehicle data in the vehicle-specific format.

6. The system as recited in claim 1, wherein the one or more media further include a vehicle instance database that associates at least one of a specific vehicle and or an individual owner with one or more different types of information.

7. The system as recited in claim 6, wherein the one or more different types of information include at least one of vehicle information, owner information, vehicle contact information and or authorization information.

8. The system as recited in claim 7, wherein the authorization information includes approved data and/or at least one accepted entity.

9. The system as recited in claim 1, wherein the one or more media further include a vehicle instance database that associates at least one of a specific vehicle or an individual owner with authorization information;
   wherein the electronically-executable instructions, when executed, cause the one or more processors to perform further actions comprising:
      determining whether an entity that sent a generic data request that includes the requested vehicle data in the generic format is an accepted entity using the authorization information; and
      determining whether the requested vehicle data is approved data using the authorization information.

10. A vehicle gateway server system comprising:
    a vehicle model database that provides correspondences between genene data and vehiele-speeific data formats in association with multiple specific vehicle types;
    translation logic that translates generic data from a generic data request into a vehicle-specific data format for a vehicle-specific data request using the vehicle model database;
    a vehicle instance database that establishes an association between (i) at least one of a vehicle or an owner of the vehicle and (ii) authorization information, the authorization information indicating what generic data requests are authorized; and
    authorization logic that authorizes or rejects the generic data request based on the authonzation information.

11. The vehicle gateway server system as recited in claim 10, farther comprising:
    at least one interface for communicating the vehicle-specific data request to a vehicle gateway device.

12. The vehicle gateway server system as recited in claim 10, further comprising:
    at least one interface for communicating with an entity to receive the generic data request.

13. The vehicle gateway sewer system as recited in claim 10, wherein the vehicle gateway server system is distributed geographically.

14. The vehicle gateway sewer system as recited in claim 10, wherein the translation logic also translates vehicle data in the vehicle-specific data format from a vehicle-specific data response into generic data for a generic data response using the vehicle model database.

15. One or more electronically-accessible media comprising a database that may be accessed, altered, and/or used electronically, the database comprising:
    a first entry that is directed to a first specific vehicle type, the first entry including:
       a first field that draws a correspondence between a first piece of generic data and a first vehicle-specific data format; and
       a second field that draws a correspondence between a second piece of generic data and a second vehicle-specific data format; and
    a second entry that is directed to a second specific vehicle type, the second entry including:
       a third field that draws a correspondence between a third piece of generic data and a third vehicle-specific data format; and
       a fourth field that draws a correspondence between a fourth piece of generic data and a fourth vehicle-specific data format.

16. The one or more electronically-accessible media comprising the database as recited in claim 15, wherein the first and second specific vehicle types each comprise one or more of a vehicle make, a vehicle model, a vehicle year, or a vehicle version.

17. One or more electronically-accessible storage media for facilitating communication with one or more vehicle buses, the one or more storage media comprising:
    a vehicle model database that associates multiple specific vehicle types with available vehicle data; and
    electronically-executable instructions that when executed, cause the performance of actions comprising:
       translating requested vehicle data in a generic format into requested vehicle data in a vehicle-specific format using the vehicle model database; and
       translating desired vehicle data in the vehicle-specific format into desired vehicle data in the generic format using the vehicle model database.

18. The one or more storage media as recited in claim 17, wherein the vehicle model database includes a plurality of entries, each entry of the plurality of entries associating a specific vehicle type with a plurality of available vehicle data.

19. The one or more storage media as recited in claim 18, wherein each entry of the plurality of entries includes a plurality of fields, each field of the plurality of fields drawing a correspondence between a piece of available vehicle data in the generic format and in the vehicle-specific format.

20. The one or more storage media as recited in claim 17, wherein the electronically-executable instructions, when executed, cause the performance of further actions comprising:
    receiving from an entity a generic data request that includes the requested vehicle data in the generic format; and
    transmitting to the entity a generic data response that includes the desired vehicle data in the generic format.

21. The one or more storage media as recited in claim 17, wherein the electronically-executable instructions, when executed, cause the performance of further actions comprising:
    transmitting to a vehicle a vehicle-specific data request that includes the requested vehicle data in the vehicle-specific format; and
    receiving from the vehicle a vehicle-specific data response that includes the desired vehicle data in the vehicle-specific format.

22. The one or more storage media as recited in claim 17, itlirther comprising a vehicle instance database that associates at least one of a specific vehicle or an individual owner with one or more different types of information.

23. The one or more storage media as recited in claim 22, wherein the one or more different types of information include at least one of vehicle information, owner information, vehicle contact information, or authorization information.

24. The one or more storage media as recited in claim 23, wherein the authorization information includes approved data andlor at least one accepted entity.

25. The one or more storage media as recited in claim 17, further comprising a vehicle instance database that associates at least one of a specific vehicle or an individual owner with authorization information;

wherein the electronically-executable instructions, when executed, cause the performance of further actions comprising:
determining whether an entity that sent a generic data request that includes the requested vehicle data in the generic format is an accepted entity using the authorization information; and
determining whether the requested vehicle data is approved data using the authorization information.

26. A method for facilitating communication with one or more vehicle buses, the method comprising:
associating, with a vehicle model database, multiple specific vehicle types with available vehicle data;
translating requested vehicle data in a generic format into requested vehicle data in a vehicle-specific format using the vehicle model database; and
translating desired vehicle data in the vehicle-specific format into desired vehicle data in the generic format using the vehicle model database.

27. The method as recited in claim 26, wherein the vehicle model database includes a plurality of entries, each entry of the plurality of entries associating a specific vehicle type with a plurality of available vehicle data.

28. The method as recited in claim 27, wherein each entry of the plurality of entries includes a plurality of fields, each field of the plurality of fields drawing a correspondence between a piece of available vehicle data in the genene format and in the vehicle-specific format.

29. The method as recited in claim 26, further comprising:
receiving from an entity a generic data request that includes the requested vehicle data in the generic format; and
transmitting to the entity a generic data response that includes the desired vehicle data in the generic format.

30. The method as recited in claim 26, further comprising:
transmitting to a vehicle a vehicle-specific data request that includes the requested vehicle data in the vehicle-specific format; and
receiving from the vehicle a vehicle-specific data response that includes the desired vehicle data in the vehicle-specific format.

31. The method as recited in claim 26, further comprising:
associating, with a vehicle instance database, at least one of a specific vehicle or an individual owner with one or more different types of information.

32. The method as recited in claim 31, wherein the one or more different types of information include at least one of vehicle information, owner information, vehicle contact information, or authorization information.

33. The method as recited in claim 32, wherein the authorization information includes approved data and/or at least one accepted entity.

34. The method as recited in claim 26, further comprising:
associating, with a vehicle instance database, at least one of a specific vehicle or an individual owner with authorization information;
determining whether an entity that sent a generic data request that includes the requested vehicle data in the generic format is an accepted entity using the authorization information; and
determining whether the requested vehicle data is approved data using the authorization information.

35. A vehicle gateway server arrangement comprising:
a vehicle model database means for providing correspondences between generic data and vehicle-specific data fonnats in association with multiple specific vehicle types;
translation logic means for translating generic data from a generic data request into a vehicle-specific data format for a vehicle-specific data request using the vehicle model database means;
a vehicle instance database means for establishing an association between (i) at least one of a vehicle or an owner of the vehicle and (ii) authorization information, the authorization information indicating what generic data requests are authorized; and
authorization logic means for authorizing or rejecting the generic data request based on the authorization information.

36. The vehicle gateway server arrangement as recited in claim 35, further comprising:
at least one interface means for communicating the vehicle-specific data request to a vehicle gateway device.

37. The vehicle gateway server arrangement as recited in claim 35, further comprising:
at least one interface means for communicating with an entity to receive the generic data request.

38. The vehicle gateway server arrangement as recited in claim 35, wherein the vehicle gateway sewer arrangement is distributed geographically.

39. The vehicle gateway server arrangement as recited in claim 35, wherein the translation logic means further comprises means for translating vehicle data in the vehicle-specific data format from a vehicle-specific data response into generic data for a generic data response using the vehicle model database means.

40. A method for a vehicle gateway server, the method comprising:
providing, with a vehicle model database, correspondences between generic data and vehicle-specific data formats in association with multiple specific vehicle types;
translating generic data from a generic data request into a vehicle-specific data format for a vehicle-specific data request using the vehicle model database;
establishing, with a vehicle instance database, an association between (i) at least one of a vehicle or an owner of the vehicle and (ii) authorization information, the authorization information indicating what generic data requests are authorized; and
based on the authorization information, authorizing or rejecting the generic data request.

41. The method as recited in claim 40, further comprising:
communicating the vehicle-specific data request to a vehicle gateway device via at least one interface.

42. The method as recited in ctaim 40, further comprising:
communicating with an entity via at least one interface to receive the generic data request.

43. The method as recited in claim 40, wherein the method is performed across a distributed geography.

44. The method as recited in claim 40, further comprising:
translating vehicle data in the vehicle-specific data format from a vehicle-specific data response into generic data for a generic data response using the vehicle model database.

45. A system comprising:
one or more processors; and
one or more media in operative communication with the one or more processors, the one or more media including a database that may be accessed, altered, and/or used electronically, the database comprising:
a first entry that is directed to a first specific vehicle type, the first entry including:

a first field that draws a correspondence between a first piece of generic data and a first vehicle-specific data format; and a second field that draws a correspondence between a second piece of generic data and a second vehicle-specific data fonrat; and a second entry that is directed to a second specific vehicle type, the second entry including:

a third field that draws a correspondence between a third piece of generic data and a third vehicle-specific data format; and a fourth field that draws a correspondence between a fourth piece of generic data and a fourth vehicle-specific data format.

46. The system comprising the one or more media that includes the database as recited in claim 45, wherein the first and second specific vehicle types each comprise one or more of a vehicle make, a vehicle model, a vehicle year, or a vehicle version.

47. An arrangement comprising a database that may be accessed, altered, and/or used electronically, the database comprising:

a first entry that is directed to a first specific vehicle type, the first entry including:

first means for drawing a correspondence between a first piece of generic data and a first vehicle-specific data format; and second means for drawing a correspondence between a second piece of generic data and a second vehicle-specific data format; and a second entry that is directed to a second specific vehicle type, the second entry including:

third means for drawing a correspondence between a third piece of generic data and a third vehicle-specific data format; and fourth means for drawing a correspondence between a fourth piece of generic data and a fourth vehicle-specific data format.

48. The arrangement comprising the database as recited in claim 47, wherein the first and second specific vehicle types each comprise one or more of a vehicle make, a vehicle model, a vehicle year, or a vehicle version.

* * * * *